US012655969B2

(12) United States Patent
Renaud et al.

(10) Patent No.: US 12,655,969 B2
(45) Date of Patent: Jun. 16, 2026

(54) ADAPTIVE LIGHT FOR A WATERCRAFT

(71) Applicant: POLARIS INDUSTRIES INC., Medina, MN (US)

(72) Inventors: Benoit J. Renaud, Elkhart, IN (US); Jacob Dewire, Bristol, IN (US); Kevin G. Mierzwa, Sylvan Lake, MI (US)

(73) Assignee: POLARIS INDUSTRIES INC., Medina, MN (US)

(*) Notice: Subject to any disclaimer, the term of this patent is extended or adjusted under 35 U.S.C. 154(b) by 0 days.

(21) Appl. No.: 18/870,897

(22) PCT Filed: Jun. 6, 2023

(86) PCT No.: PCT/US2023/024509
§ 371 (c)(1),
(2) Date: Dec. 2, 2024

(87) PCT Pub. No.: WO2023/239682
PCT Pub. Date: Dec. 14, 2023

(65) Prior Publication Data
US 2025/0257869 A1 Aug. 14, 2025

Related U.S. Application Data

(60) Provisional application No. 63/350,980, filed on Jun. 10, 2022.

(51) Int. Cl.
*F21V 23/04* (2006.01)
*B63B 45/02* (2006.01)
(Continued)

(52) U.S. Cl.
CPC .......... *F21V 23/0492* (2013.01); *B63B 45/02* (2013.01); *B63B 45/04* (2013.01);
(Continued)

(58) Field of Classification Search
CPC ..... B63B 2201/04; B63B 45/00; B63B 45/02; B63B 45/04; B63B 45/06; B63B 45/08; B63B 2045/005; F21V 23/0492
See application file for complete search history.

(56) References Cited

U.S. PATENT DOCUMENTS 6,030,099 A * 2/2000 McDermott ............ B63B 45/04 362/477
2004/0240217 A1 12/2004 Rice
(Continued)

FOREIGN PATENT DOCUMENTS

CN 109442334 A 3/2019
EP 1106432 A1 6/2001
(Continued)

OTHER PUBLICATIONS

International Search Report and Written Opinion of the ISA issued in PCT/US2023/024509, mailed Nov. 14, 2023; ISA/EP.
(Continued)

*Primary Examiner* — Robert J May
(74) *Attorney, Agent, or Firm* — SCHWEGMAN LUNDBERG & WOESSNER, P.A.

(57) ABSTRACT

A lighting system for a watercraft includes a level sensor generating a level signal corresponding to a level of the watercraft. The system also includes a light source. The system also includes a plurality of elements optically coupled to the light source. The system also includes a controller coupled to the level sensor and the light source, said controller controlling the light source to illuminate selected elements less than all the elements to form a beam pattern.

16 Claims, 9 Drawing Sheets

(51) Int. Cl.

| | |
|---|---|
| ***B63B 45/04*** | (2006.01) |
| ***F21S 41/63*** | (2018.01) |
| ***F21S 41/657*** | (2018.01) |
| ***F21S 41/663*** | (2018.01) |
| ***F21S 43/00*** | (2018.01) |

(52) U.S. Cl.

CPC ........... *F21S 41/635* (2018.01); *F21S 41/657* (2018.01); *F21S 41/663* (2018.01); *F21S 43/601* (2024.05)

(56) References Cited

U.S. PATENT DOCUMENTS

| | | | | |
|---|---|---|---|---|
| 2013/0329439 | A1 | 12/2013 | Hellkamp | |
| 2024/0391569 | A1* | 11/2024 | Robertson | B63B 45/06 |

FOREIGN PATENT DOCUMENTS

| | | | |
|---|---|---|---|
| FR | 2866693 | A1 | 8/2005 |
| WO | WO-2023239682 | A1 | 12/2023 |
| WO | WO-2023239682 | A4 | 2/2024 |

OTHER PUBLICATIONS

"International Application Serial No. PCT/US2023/024509, International Preliminary Report on Patentability mailed Dec. 19, 2024", 14 pgs.
"International Application Serial No. PCT/US2023/024509, Invitation to Pay Additional Fees mailed Sep. 22, 2023", 12 pgs.
"International Application Serial No. PCT/US2023/024509, Response to Written Opinion filed Jan. 5, 24 to Written Opinion mailed Nov. 14, 2023", 6 pgs.

* cited by examiner

ADAPTIVE LIGHT FOR A WATERCRAFT

CROSS-REFERENCE TO RELATED APPLICATIONS

This application is a U.S. National Phase Application under 35 U.S.C. 371 of International Application No. PCT/US2023/024509, filed on Jun. 6, 2023, which claims the benefit of U.S. Provisional Application No. 63/350,980, filed on Jun. 10, 2022. The entire disclosures of the above applications are incorporated herein by reference.

FIELD

The present disclosure relates to lights for watercraft and, more particularly, to an adaptive light for controllably illuminating a predetermined area.

BACKGROUND

Watercraft typically have exterior lights such as docking lights. When a watercraft is loaded unevenly, the lights may not be directed in the desired direction. For example, when the watercraft is a pontoon boat and the pontoon boat is loaded in the aft, the lights may shine brightly on the surrounding houses when docking. Conversely, when a significant load is in the front of a pontoon boat, the docking lights may be directed down into the surface of the water very close to the front of the boat and therefore not helpful in illuminating the dock.

Another type of light in a watercraft is a mast light or anchor light. The mast light is used to direct light outward from the watercraft so that the boat is visible for a predetermined distance. The light from the mast or anchor light is typically directed at a plane parallel to the surface of the water so that it is visible to other boats at a long distance. However, when a watercraft is loaded in an unbalanced manner, the light may be directed downward or upward depending upon where the loading is relative to the watercraft. In a roll direction, when the starboard side of the boat is heavily weighted, the mast light may be directed down on that side of the boat whereas the mast light on the port side of the boat may be directed upward. This may reduce the visibility of the boat to other users.

Another type of light that a watercraft may have a side light. A side light may be used for illuminating the dock when the watercraft is loading and unloading. During the loading and unloading process, the roll angle of the watercraft may change as people move toward the exit.

SUMMARY

The present disclosure provides a light system that adjusts to accommodate the level of the watercraft. Docking lights, side lights and mast lights may all benefit from the examples set forth below.

In a first example of the present disclosure, one general aspect includes a lighting system for a watercraft. The lighting system also includes a level sensor generating a level signal corresponding to a level of the watercraft. The system also includes a light source. The system also includes a plurality of elements optically coupled to the light source. The system also includes a controller coupled to the level sensor and the light source, said controller controlling the light source to illuminate selected elements less than all the elements to form a beam pattern.

Implementations may include one or more of the following features. The lighting system where the level sensor generates a pitch angle signal, and the controller controls the light source based on the pitch angle signal. The level sensor generates a roll angle signal, and the controller controls the light source based on the roll angle signal. The lighting system may include a user interface coupled to the controller for controlling an operation of the light source. The plurality of elements is disposed vertically. The plurality of elements is mounted to a curved surface. The plurality of elements may include at least one positive angle element and a at least one negative angle element. The plurality of elements is disposed horizontally. The light source may include a plurality of light sources, each of the plurality of light sources corresponding to one of the plurality of elements. The plurality of elements may include groups of elements having the same angle of direction. An actuator is coupled to and moves the light source relative to the plurality of elements. The light source moves vertically relative to the plurality of elements. The plurality of elements is disposed on a side of the watercraft. The plurality of elements is disposed on a port side, a starboard side or both. The plurality of elements is disposed on a bow of the watercraft. The plurality of elements is disposed on a front side. The plurality of elements circumscribes a mast. The plurality of elements circumscribes the mast in a plurality of columns. The plurality of elements circumscribes the mast in a plurality of rows and columns.

One general aspect includes a light assembly for a watercraft may include. The light assembly also includes a housing. The assembly also includes a lens coupled to the housing. The assembly also includes a light source coupled withing the housing directing light through the lens. The assembly also includes a level sensor generating a level signal corresponding to a level of the watercraft. The assembly also includes an actuator moving the housing, the light source and the lens in response to the level signal.

One general aspect includes a light assembly for a watercraft may include. The light assembly also includes a lens. The assembly also includes a light source coupled optically coupled to the lens. The assembly also includes a level sensor generating a level signal corresponding to a level of the watercraft. The assembly also includes an actuator moving the lens relative to the light source in response to the level signal.

Additional features of the present disclosure will become apparent to those skilled in the art upon consideration of the following detailed description of illustrative examples exemplifying the best mode of carrying out the disclosure as presently perceived.

BRIEF DESCRIPTION OF THE DRAWINGS

The foregoing aspects and many additional features of the present system and method will become more readily appreciated and become better understood by reference to the following detailed description when taken in conjunction with the accompanying drawings, where.

DETAILED DESCRIPTION

Figure 1:
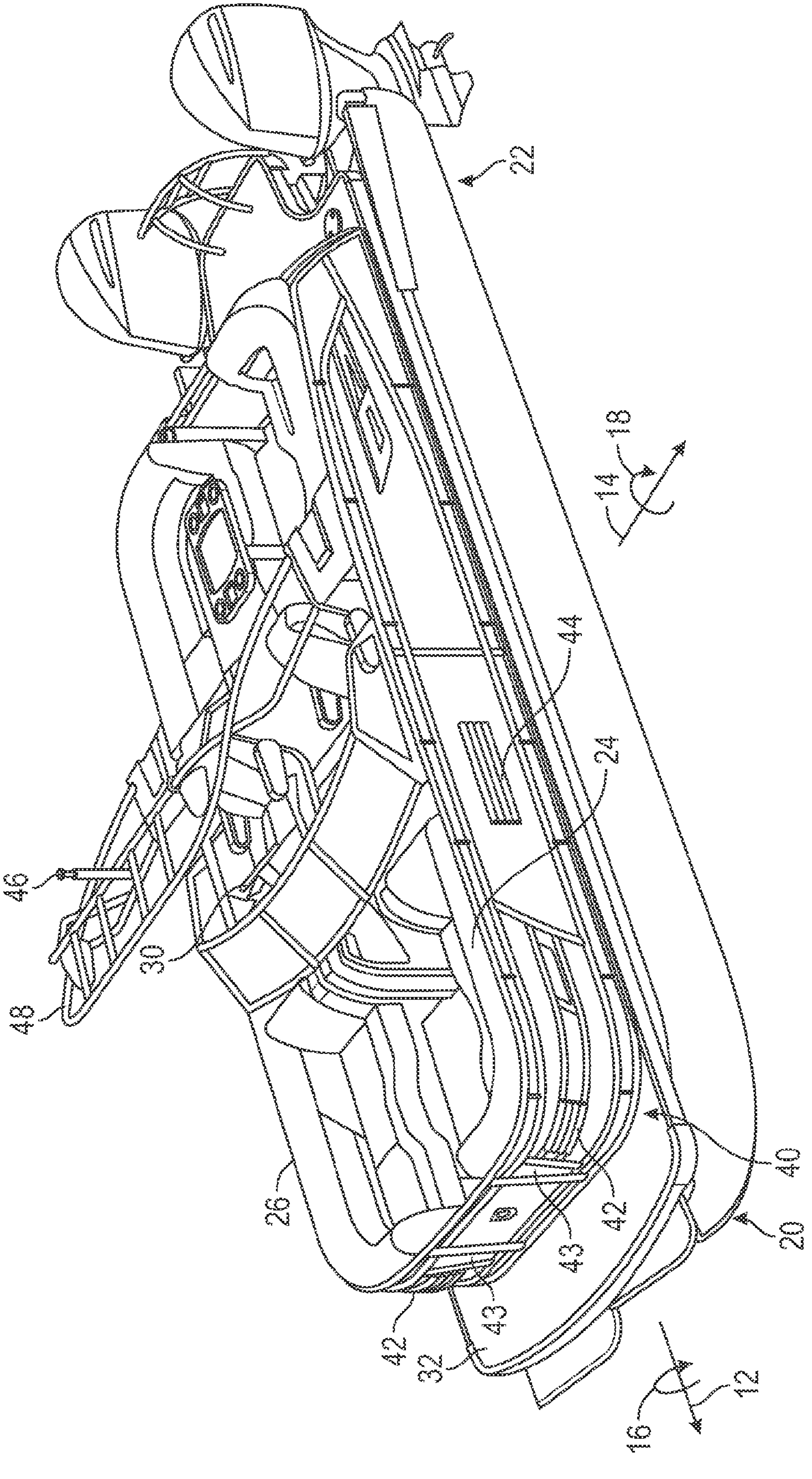
FIG. 1 is a perspective view of a watercraft having a light system according to the present disclosure.

For the purposes of promoting an understanding of the principles of the present disclosure, reference will now be made to the examples illustrated in the drawings, which are described below. The examples disclosed below are not intended to be exhaustive or limited to the precise form disclosed in the following detailed description. Rather, the examples are chosen and described so that others skilled in the art may utilize their teachings.

Referring now to FIG. 1, a watercraft 10 is set forth as a pontoon boat. However, the teachings set forth herein apply to other types of watercraft including but not limited to personal watercrafts, ski, boats, surf boats, fishing boats and work boats and yachts. The watercraft has a longitudinal axis 12 and a lateral axis 14.

The movement of the watercraft 10 about the longitudinal axis 12 is referred to as the roll angle or roll direction of the watercraft as indicated by the arrow 16. The pitch of the watercraft 10 is indicated by the arrow 18 about the lateral axis 14. A bow 20 of the watercraft 10 may be lower than a stern 22 of the watercraft 10 when a load such as passengers is greater in the bow 20, the stern 22, when loaded, without loading in the bow 20 may allow the bow 20 to be directed upward. Likewise, the port side 24 of the watercraft 10 may be lower than the starboard side 26 when a greater loading is on the port side 24. Likewise, when a greater loading is on the starboard side 26 may be lower than the port side 24 so that the watercraft 10 has a different roll angle. When the watercraft 10 is pitched forward and rearward, the pitch angle denoted by 18 changes. The watercraft 10 may have a helm 30 that is used for controlling the watercraft 10. The helm 30 may include various user interfaces and switches for controlling various functions of the vehicle including the lighting functions of the watercraft. The lighting functions of the watercraft are included within a lighting system 40. The lighting system 40 is not limited to docking lights 42. In this example, two docking lights 42 are illustrated on each side of a front wall 43 of the watercraft 10. Details of the docking lights 42 are described in more detail below.

The lighting system 40 may also include a boarding light 44. One boarding light 44 is illustrated on the port side 24 of the watercraft 10. However, a boarding light 44 may also be located on the starboard side 26 of the watercraft 10. The sides 24, 26 and the helm 30 are mounted to a deck 32. The level of the deck 32 is parallel to the plane of the water in calm conditions and under no or even loads.

A mast light 46 is coupled to a tower 48. The mast light 46 may also be located in various positions within the watercraft included coupled to the stern 22 of the watercraft 10.

Figure 2A:
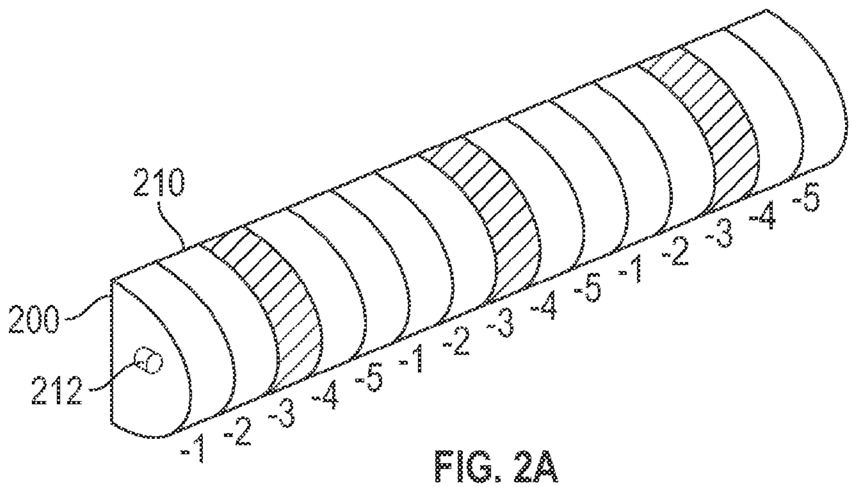
FIG. 2A is a perspective view of various elements in a first example of a light assembly.
Figure 2B:
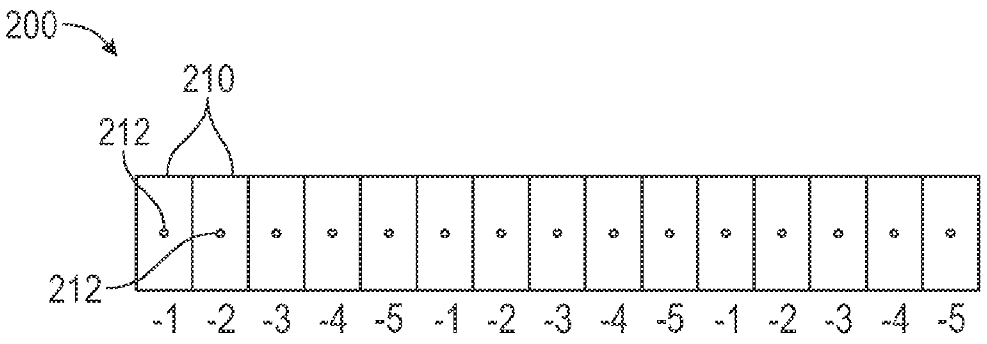
FIG. 2B is a front view of the light assembly of FIG. 2A.
Figure 2C:
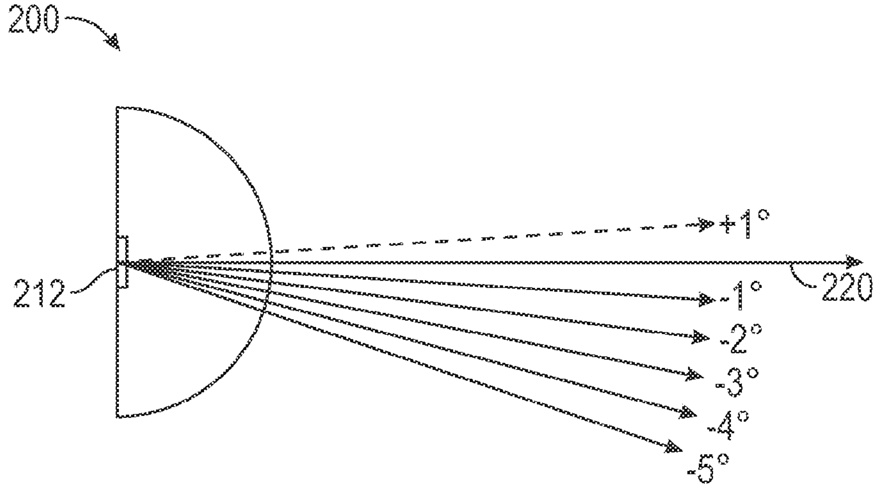
FIG. 2C is a side cross sectional view of the light assembly of FIGS. 2A and 2B.

Referring now to FIG. 2A, 2B and 2C, a light assembly 200 is illustrated. The light assembly 200 has a plurality of optical elements 210. The optical elements are each associated with and optically coupled to a light source 212. In this example, one light source 212 is provided for each of the elements 210. In the present example, the elements 210 are labeled 1-5. The elements labels correspond to negative angles in degrees that correspond to the degrees below the horizon. During the operation, all of the "1s" or "2s" or "3s" or "4s" or "5s" are illuminated together. The "1s", "2s", "3s", "4s", "5s" are groups of elements that have the same angle. Less than all the elements are illuminated at any one time. Of course, more than one element number may be illuminated at the same time. For example, elements 2 and 3 may be illuminated or 2, 3 and 4 depending upon the various conditions. As will be described in more detail below, the level of the deck 32 of the watercraft 10 may be measured as to the pitch angle and roll angles to determine which of the elements 210 to illuminate. That is, the light source 212 associated with the desired angle are illuminated while other light sources are not illuminated. Of course, other types of angles may be associated with the elements. For example, positive angles may also be associated with the elements 210. This will allow front loaded watercrafts 10 to illuminate the area toward the dock while docking. Although the elements 210 are disposed horizontally, other layouts of the elements 210 are possible.

Referring now to FIG. 2C, a side view of the light assembly 200 is illustrated. In this example, the angle of the light beams from the various elements are illustrated in the single figure to illustrate the differences. In this example, a horizontal line 220 that is parallel to the horizon and the water level at the watercraft 10. The element labeled 1 in FIGS. 2A and 2B provides −1° of light direction relative to the horizontal line 220. Elements 2-5 provide −2° to −5° of angle relative to the horizontal line 220. Other examples may provide a positive angle illustrated as +1° relative to the horizontal line 220. Angles greater than the horizontal may be used when the bow 20 of the watercraft 10 is more heavily loaded than the stern 22 of the watercraft 10.

Figure 3:
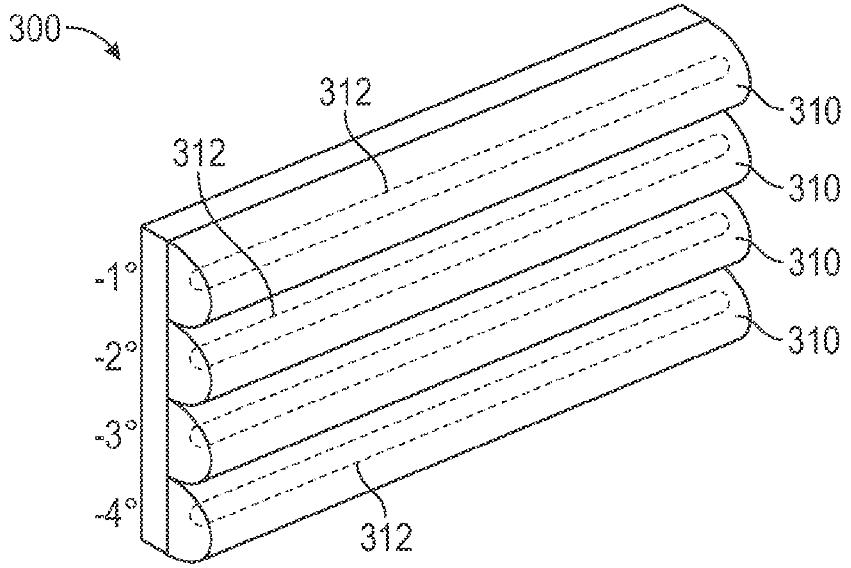
FIG. 3 is a perspective view of a light assembly having light bars as elements.

Referring now to FIG. 3, a light assembly 300 is illustrated. The light assembly 300 has a plurality of elements 310 disposed vertically that have different optical characteristics or similar to that described above with respect to FIG. 2A. In this example, the light elements 310 are labeled −1°, −2°, −3° and −4° from the vertically higher position to the vertically lower position. In this example, a plurality of light sources 312 may be associated with each of the elements. In this example, the dashed lines illustrate the position of the light sources 312 behind the elements 210. When LEDs are used, a strip or line of LEDs mounted on a circuit board may be mounted parallel to correspond to positions behind each of the elements 210.

The light assemblies 200, 300 may form part of a docking light system and a boarding light system as the docking light 42 or the boarding light 44.

Figure 4A:
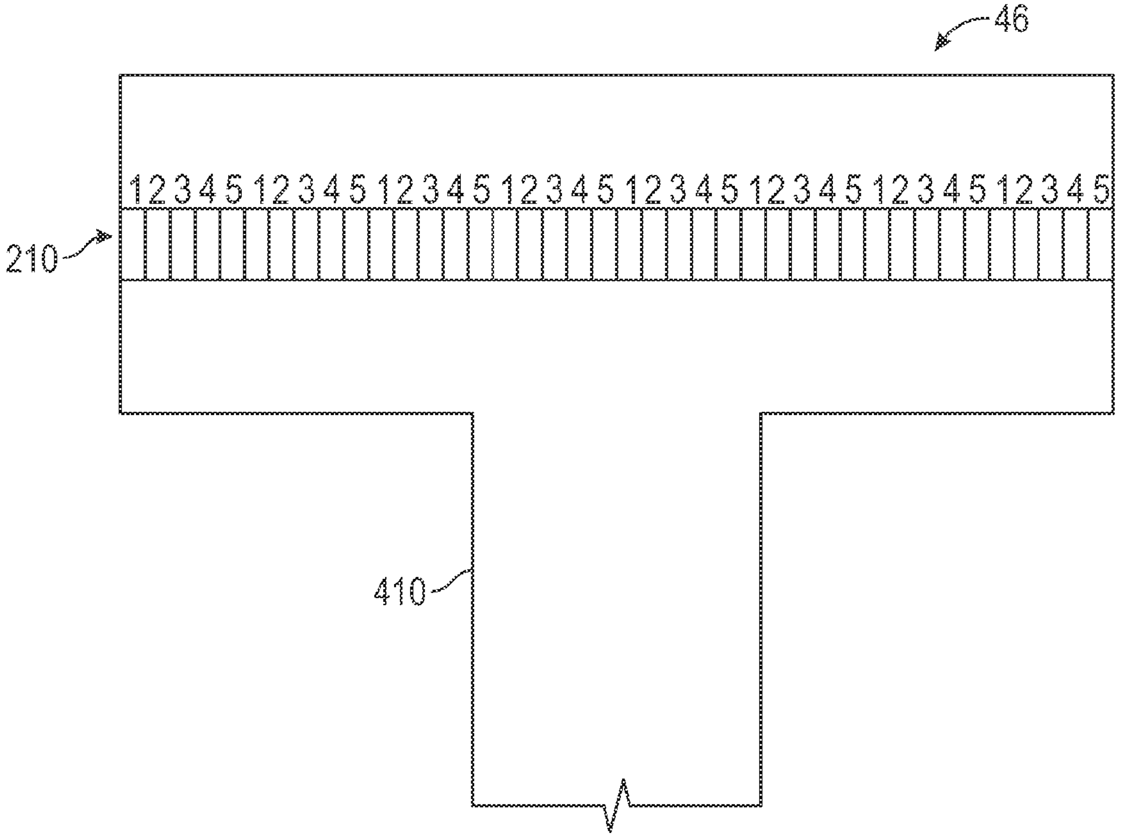
FIG. 4A is a side view of a first example of a light assembly used in a mast.
Figure 4B:
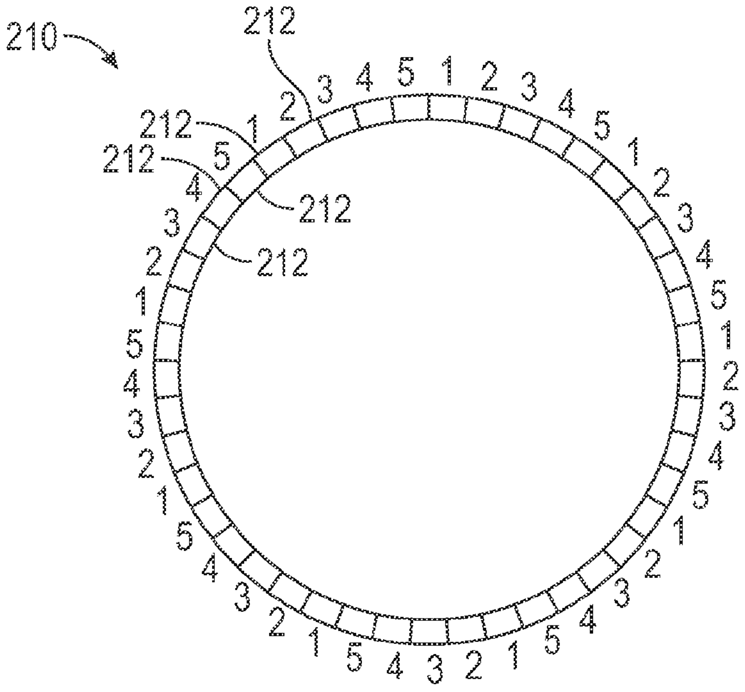
FIG. 4B is a top view of a light assembly used in a mast.

Referring now to FIGS. 4A and 4B, examples of a mast light system 46, 46' are illustrated. In FIG. 4A, light elements 210 similar to those described above in FIG. 2A are provided. In this example, the light elements 210 are illustrated around the mast 410. As set forth in the example in FIG. 2A, the angles of the elements may vary.

A controller, as described below, may illuminate one or more of the angles of the elements 210. For example, the angle 1 may be illuminated in each position around the mast 410. When the watercraft 10 pitches or rolls, other numbers of the elements may be illuminated to provide the light in the desired direction preferably nearly parallel to the surface of the water. The relative pitch and roll angles of the watercraft 10 may be determined and light elements on different sides of the mast 410 may be illuminated with different numbers of elements. That is, on one side of the watercraft 10, the 1s may be illuminated while on the other side of the watercraft, 5s may be illuminated.

Figure 4C:
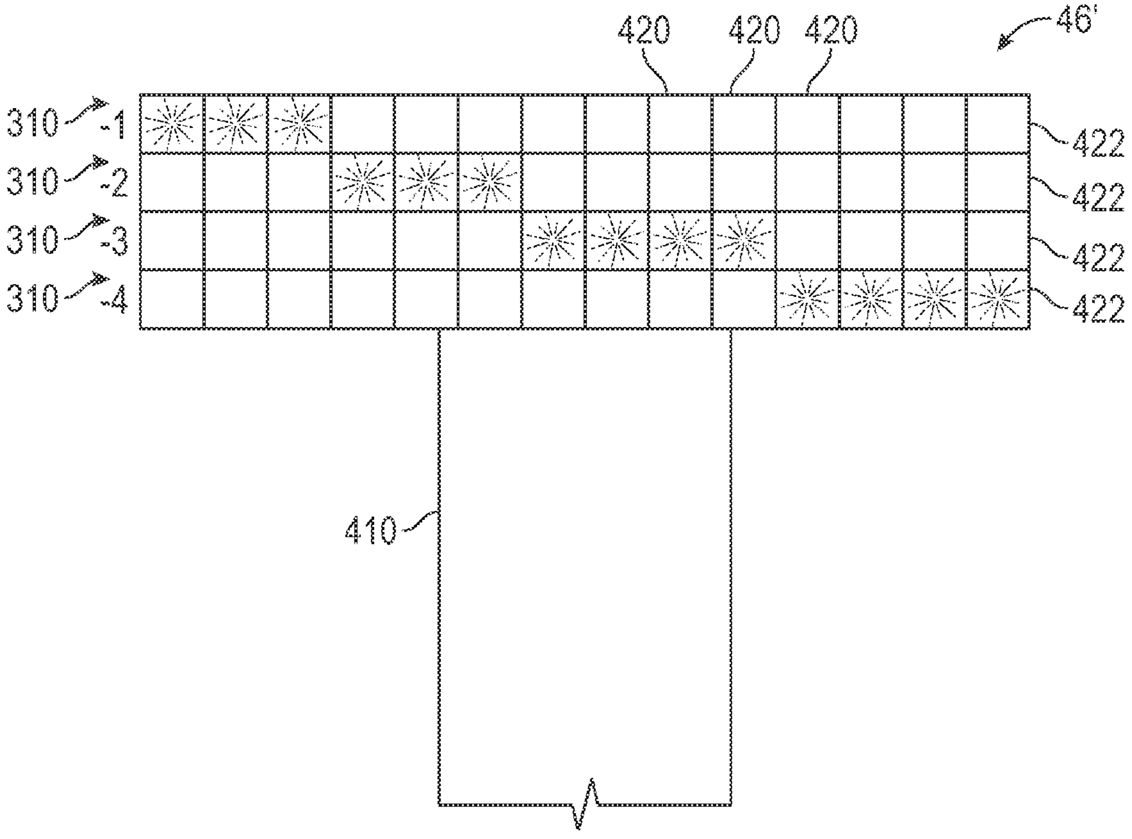
FIG. 4C is a side view of a second example of a light assembly for a mast.

Referring now to FIG. 4C, an example similar to that set forth in FIG. 3 is provided. That is, the elongated elements 310 may be shortened to provide the smaller areas thereof. From the top of the mast 410, the elements may have the desired amount of angles, such as −1, −2, −3 and −4. However, as they circumscribe the mast 410, the elements 310 may be individually controlled to allow various columns 420 of the lights to be illuminated individually to compensate for pitching or rolling of the watercraft 10. The elements may further be disposed in rows 422. The rows 422 and columns 420 may be individually addressable. The controller thus controls the elements to obtain the desired angle corresponding to the pitch angle, roll angle or both of the watercraft 10. The shaded elements 310 illustrate the compensation of an illumination of various elements to compensate for the roll and pitch angles of the watercraft.

Figure 5A:
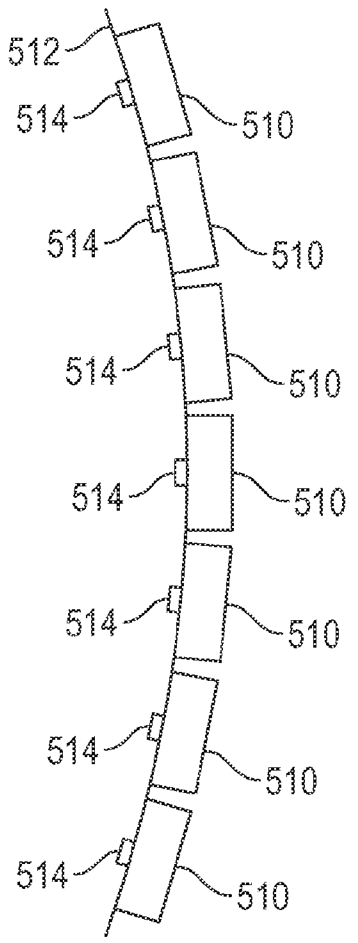
FIG. 5A is a side view of a light assembly having common elements.
Figure 5B:
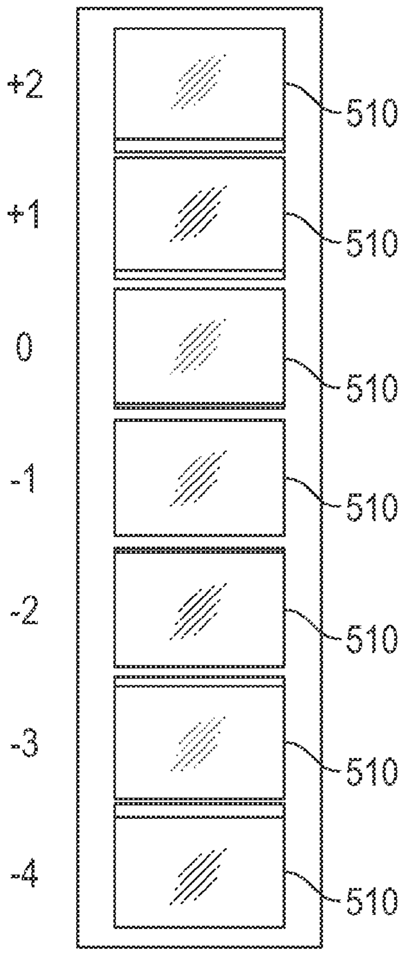
FIG. 5B is a front elevational view of the light assembly of FIG. 5A.

Referring now to FIGS. 5A and 5B, in this example, elements 510 may all be constructed with similar optics emitting the light in a direction perpendicular to a curved surface 512. In this example, light sources 514 in combination with the elements direct light at various angles including +2, +1, which are positive angle elements, 0 which corresponds to horizontal, −1, −2, −3 and −4, which are negative angle elements. Each of the elements 510 are mounted on the surface 512 which positions the output of the light from the light sources in the desired direction. In a similar manner to that mentioned above, the one or more of the light sources 514 corresponding to the desired direction of the elements 510 may be illuminated at one time according to the level of the watercraft 10.

Figure 6A:
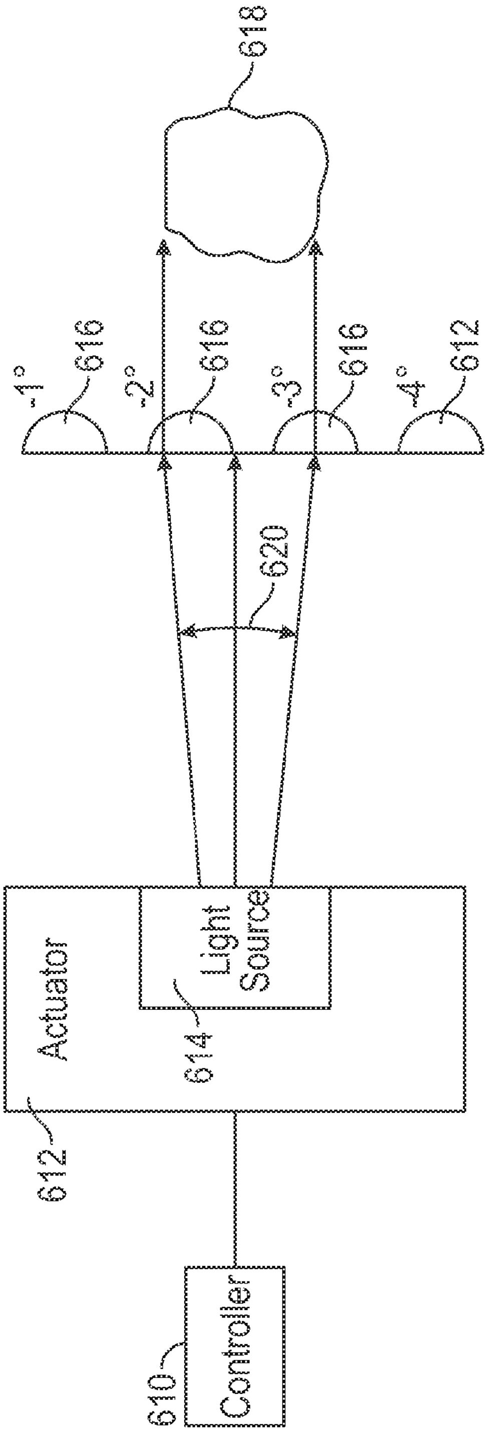
FIG. 6A is a side view of a light assembly having an actuator in a first position.

Referring now to FIG. 6A, a controller 610 is coupled to an actuator 612. The actuator 612 is a movable structure that has a position controlled by the controller 610. The actuator 612 may move a single light source 614 to illuminate through various elements 616 to form the desired beam pattern 618. In this example, the light source 614 has a beam spread angle 620 illustrated by the arrow. The light source 614 is moved by the actuator 612 in a vertical direction. However, other directions such as horizontal or other non-orthogonal angles may be used. The angle 620 may thus be moved by the actuator 612 as illustrated by contrasting FIGS. 6A and 6B. In this example, the elements 616 represent −1°, −2°, −3° and −4°. As mentioned above, various types of angles may be used by the elements. The angles emitted by the light source 614 are controlled by the actuator rather than the optics of the elements 616. However, optics may also be included within the element to spread and position the beam into the desired beam pattern 618.

Figure 7:
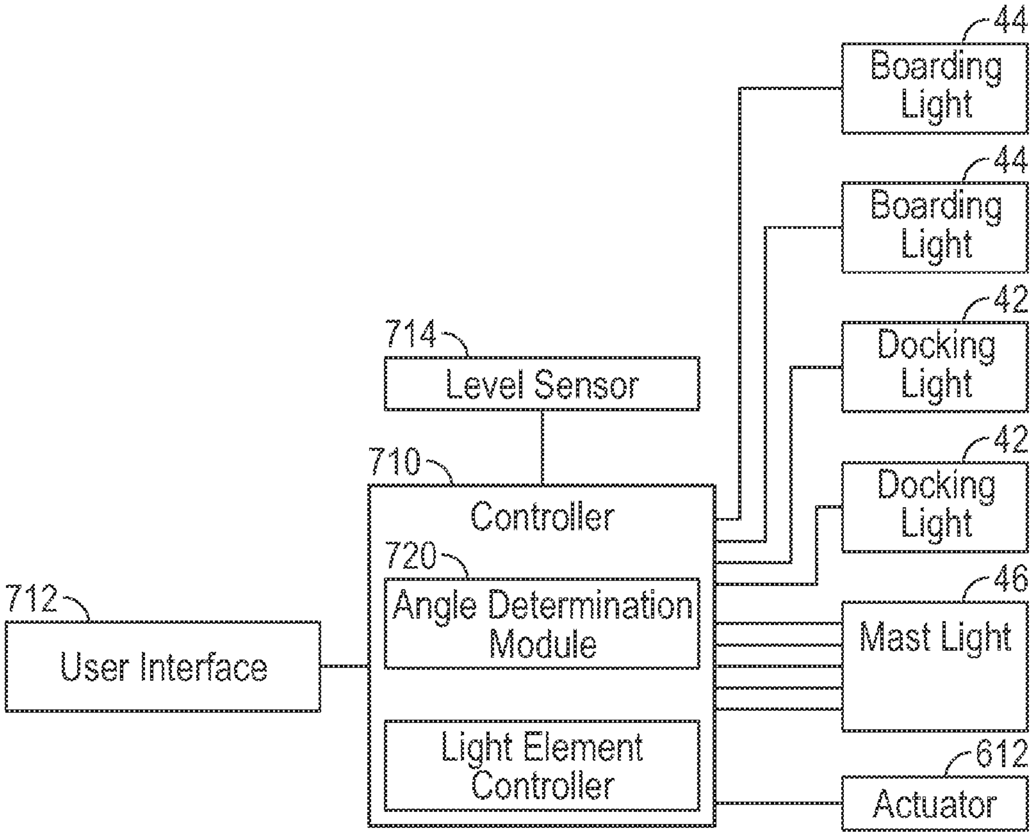
FIG. 7 is a block diagrammatic view of a controller for controlling the light assembly of the watercraft.

Referring now to FIG. 7, a control system for controlling the lighting system 40 and illuminated selected elements less than the total number of elements is set forth. In this example, a controller 710 is set forth. The controller may be a microprocessor-based controller or another type of discrete circuitry. The controller 710 is coupled to a user interface 712. The user interface 712 may be switches, dials or elements on a touch screen display. The user interface 712 may be used for turning on and off various lights within the watercraft 10. Separate controls may be provided for the docking lights 42, the boarding lights 44 and the mast light 46.

The controller 710 is coupled to a level sensor 714. The level sensor 714 generate a signal or signals corresponding to the level of the watercraft 10 relative to the water. In many examples, the deck 32 is parallel to the water. The level sensor 714 may therefore provide signals corresponding to the level of the deck 32.

The level sensor 714 may be a gyroscopic-type sensor that generates a pitch angle signal corresponding to the pitch angle, and a roll angle signal corresponding to the roll angle. Similar sensors are incorporated into various consumer electronics including controllers for video games and controllers of a cell phone for controlling the displays thereof.

The controller 710 ultimately controls the various elements of the docking lights 42, the boarding lights 44 and the mast light 46. A number of control lines are illustrated associated with the mast light 46. Each of the boarding lights and boarding lights 44 may have separate control wires used for controlling the various elements. In the case of the mast lights 46, various columns of elements and the lights associated therewith may be provided.

Figure 6B:
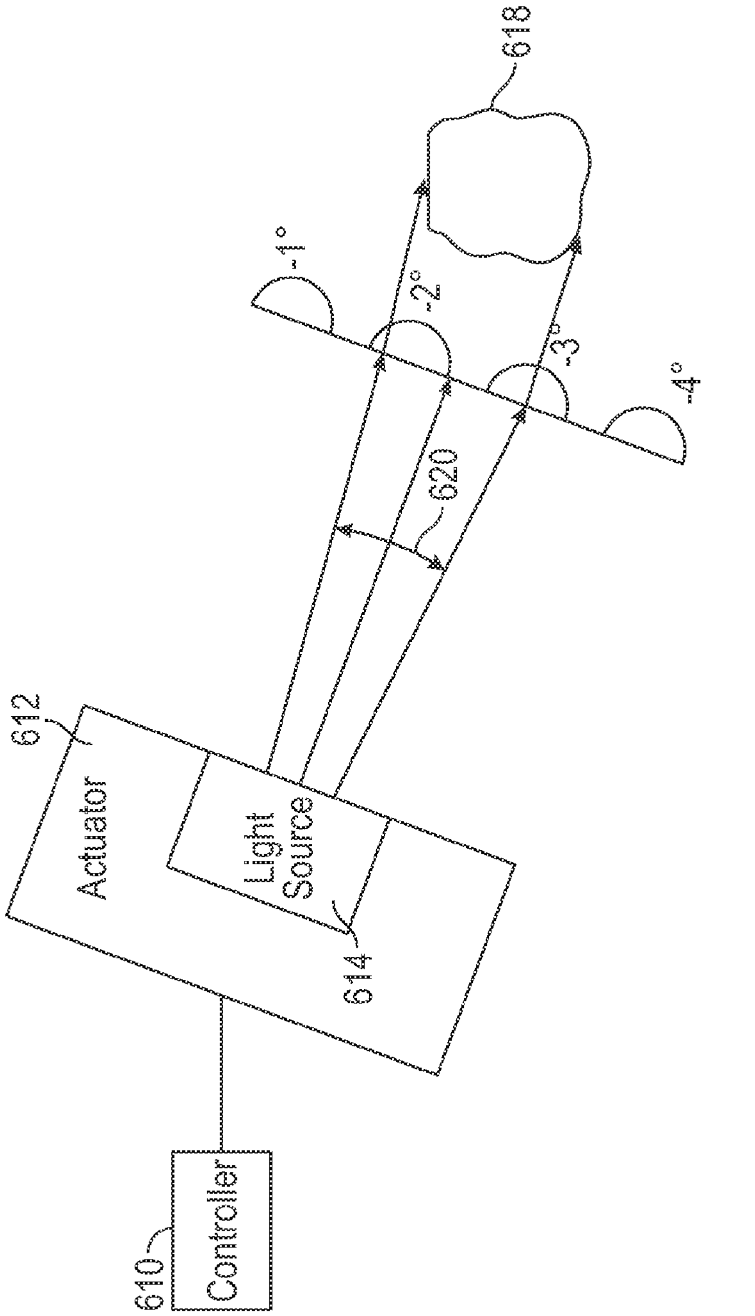
FIG. 6B is a side view of the light assembly of FIG. 6A having another position of the actuator.

The controller 710 may also be coupled to control an actuator 612 from FIGS. 6A and 6B. That is, the controller 710 may generate an angle signal to move the actuator 612 in the desired direction.

The controller 710 may have various modules therein for controlling the elements and the actuator 612. In one example, the controller 710 has an angle determination module 720. The angle determination module 720 uses the level signals from the level sensor 714 to determine the angle of the watercraft and thereafter determine the elements that are to be illuminated at the docking lights 42, the boarding lights 44 and/or the mast light 46. The angle determination module for the mast light 46 may determine different angles for different elements depending upon the side of the board, illustrations of which were provided in FIG. 4C.

Figure 8:
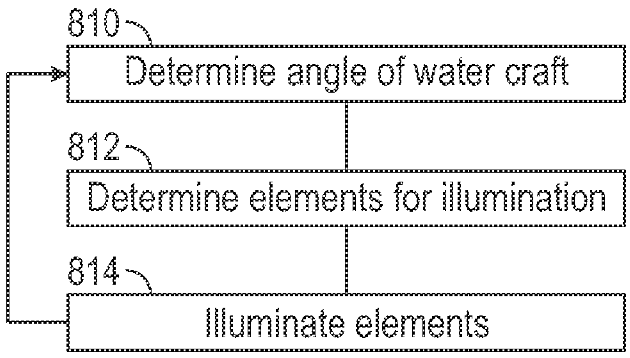
FIG. 8 is a flowchart of a method for operating the light assembly.

Referring now to FIG. 8, a method for operating the light system 40 is illustrated. In step 810, the watercraft angle is determined from the level sensor 714. The angle of the watercraft may refer to the pitch angle, the roll angle or combination of the pitch and roll angle. In step 812, the elements for illumination are determined. The determination of the elements and the illumination of the light sources corresponding to the elements is based upon a desired beam pattern. For docking lights, it is desirable to illuminate an area that the watercraft is headed toward. When the watercraft 10 is pitched so the bow is higher than the horizontal, negative beam elements directing the light in a negative direction relative to the deck is provided. This allows the lights to remain shining at the dock rather than the nearby surroundings such as a home. In step 814, the elements continually illuminate in the desired direction. The process repeats continually during operation in step 810. As long as the user interface indicates the desired lights to be operated, the system may continually determine the angle of the watercraft and continually adjust the elements used.

In wavy conditions and other unstable conditions, the continuous determination of the angle may allow the lights to maintain visibility for the watercraft operator. From side to side and bow to stern, the lights may be independently controlled if the weight or waves cause uneven distribution. For example, if the starboard bow corner is higher than the port bow then more negative angle may be applied to the docking light on the correspondingly higher corner.

Figure 9:
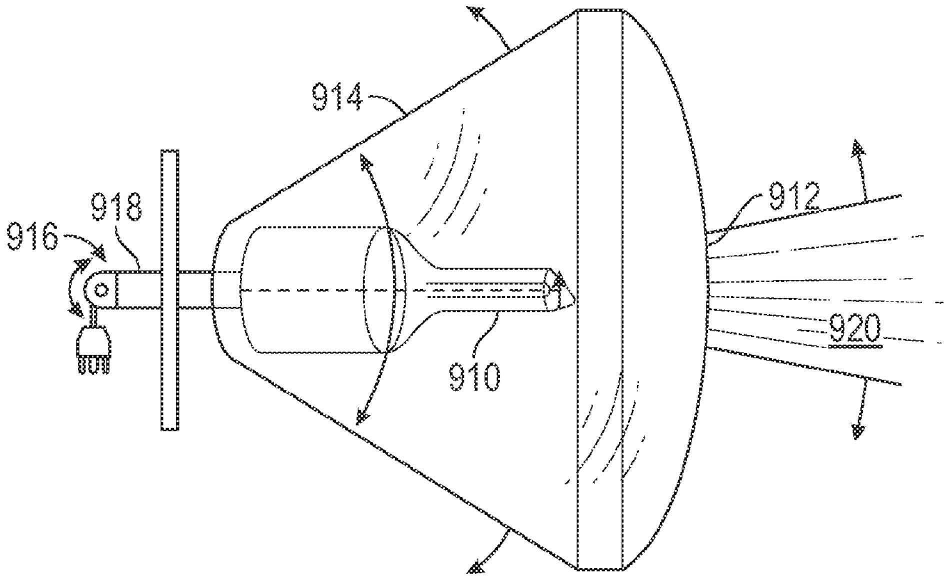
FIG. 9 is a side view of a light assembly with a light source and lens that pivot.

Referring now to FIG. 9, a light source 910 is illustrated with respect to an element or lens 912. The lens 912 and the light source 910 are coupled to a housing 914. The housing 914 is coupled to an actuator 916 by way of an arm 918. The actuator 916 by way of the arm 918 rotates the housing 914 and thus the light source 910, the lens 912 and the beam 920 generated thereby into the desired direction to compensate for the level of the watercraft 10. Both the light source 910 and the lens 912 pivot in response to movement of the actuator 916.

Figure 10:
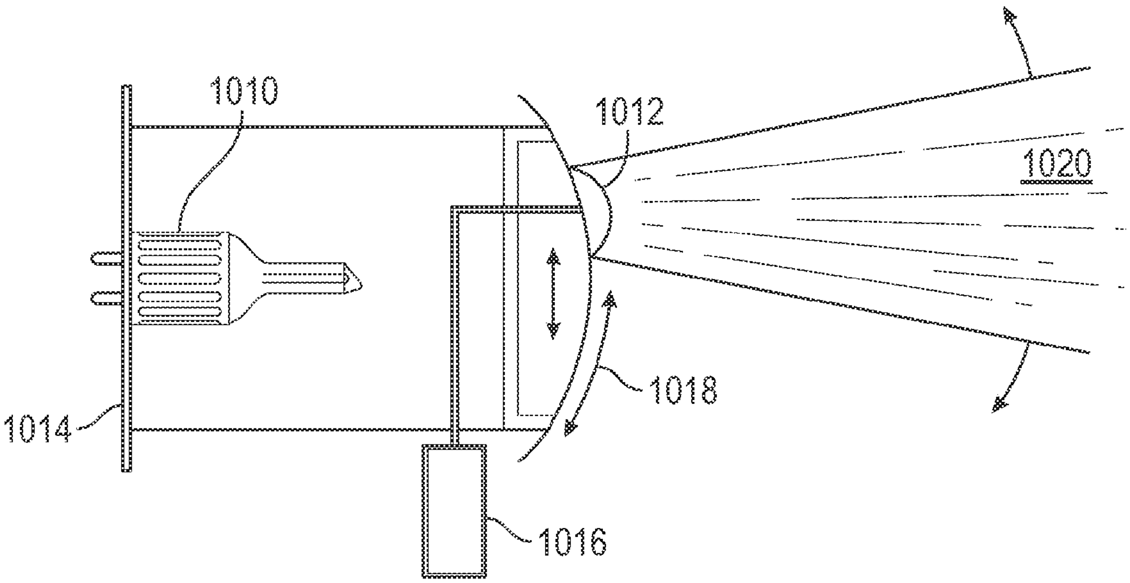
FIG. 10 is a side view of a light assembly that has an actuator that moves the lens with a stationary light source.

Referring now to FIG. 10, a stationary light source 1010 is illustrated relative to an element or lens 1012. The light source 1010 is mounted to a mount 1014 which is one example of a stationary structure. The lens 1012 is coupled to an actuator 1016. The actuator 1016 moves the lens 1012 along a curved path 1018. The curved path 1018 allows the optics within the lens 1012 changes the angle of the flood beam 1020 into the desired direction.

In both FIGS. 9 and 10, the level sensor 714 provides an input to move the actuator 916 or 1016 so that the flood beams 920, 1020 are directed in the desired direction to compensate for the watercraft being not level. The level signal of the level sensor 714 may be directed directly to the actuators 916.1016 or to the controller 710 that controls the actuator 916, 1016.

Examples are provided so that this disclosure will be thorough and will fully convey the scope to those who are skilled in the art. Numerous specific details are set forth such as examples of specific components, devices, and methods, to provide a thorough understanding of examples of the present disclosure. It will be apparent to those skilled in the art that specific details need not be employed, that examples may be embodied in many different forms and that neither should be construed to limit the scope of the disclosure. In some examples, well-known processes, well-known device structures, and well-known technologies are not described in detail.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A lighting system for a watercraft comprising:
- a level sensor generating a level signal corresponding to a level of the watercraft;
- a light source;
- a plurality of elements optically coupled to the light source; and
- a controller coupled to the level sensor and the light source, said controller controlling the light source to illuminate selected elements less than all the elements to form a beam pattern; wherein the plurality of elements is mounted to a curved surface that is curved in a vertical direction, each element of the plurality of elements directing light perpendicular to the curved surface.

2. The lighting system of claim 1 wherein the level sensor generates a pitch angle signal, and the controller controls the light source based on the pitch angle signal.

3. The lighting system of claim 1 wherein the level sensor generates a roll angle signal, and the controller controls the light source based on the roll angle signal.

4. The lighting system of claim 1 further comprising a user interface coupled to the controller for controlling an operation of the light source.

5. The lighting system of claim 1 wherein the plurality of elements is disposed vertically.

6. The lighting system of claim 1 wherein the plurality of elements comprises at least one positive angle element and at least one negative angle element.

7. The lighting system of claim 1 wherein the plurality of elements is disposed horizontally.

8. The lighting system of claim 1 wherein the light source comprises a plurality of light sources, each of the plurality of light sources corresponding to one of the plurality of elements.

9. The lighting system of claim 1 wherein an actuator is coupled to and moves the light source relative to the plurality of elements.

10. The lighting system of claim 9 wherein the light source moves vertically relative to the plurality of elements.

11. A boarding light system for a watercraft comprising:
- the lighting system of claim 1;
- wherein the plurality of elements is disposed on a side of the watercraft.

12. The boarding light system as recited in claim 11 wherein the plurality of elements is disposed on a port side, a starboard side or both.

13. A docking light system for a watercraft comprising:
- the lighting system of claim 1;
- wherein the plurality of elements is disposed on a bow of the watercraft.

14. The docking light system as recited in claim 13 wherein the plurality of elements is disposed on a front side.

15. A lighting system for a watercraft comprising:
- a level sensor generating a level signal corresponding to a level of the watercraft;
- a plurality of light sources;
- a plurality of elements optically coupled to the light sources, each of the plurality of light sources corresponding to one of the plurality of elements, wherein the elements of each group are spaced apart by elements of at least one other group, the plurality of elements comprises groups of elements having a same angle of light direction; and
- a controller coupled to the level sensor and the light source, said controller controlling one of the groups of light sources to illuminate selected elements less than all the elements to form a beam pattern, wherein the plurality of elements is mounted to a curved surface that is curved in a vertical direction.

16. A mast light system for a watercraft comprising:
- a level sensor generating a level signal corresponding to a level of the watercraft said level corresponding to pitch and roll of the watercraft;
- a light source;
- a plurality of elements optically coupled to the light source; and a controller coupled to the level sensor and the light source, said controller controlling the light source to illuminate selected elements less than all the elements to form a beam pattern;

wherein the plurality of elements circumscribes a mast, wherein the plurality of elements circumscribes the mast in a plurality of rows and columns;

said controller addressing individually addressable elements different elements in different rows and different columns to compensate for the pitch and the roll of the watercraft.

* * * * *